(12) United States Patent
Todoroki et al.

(10) Patent No.: US 11,178,137 B2
(45) Date of Patent: Nov. 16, 2021

(54) SYSTEM FOR IOT DEVICES COMMUNICATING WITH SERVER USING A TENTATIVE COMMON KEY

(71) Applicant: RENESAS ELECTRONICS CORPORATION, Tokyo (JP)

(72) Inventors: Takahide Todoroki, Tokyo (JP); Koichi Sato, Tokyo (JP); Kazuhiko Noto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 255 days.

(21) Appl. No.: 16/409,424

(22) Filed: May 10, 2019

(65) Prior Publication Data
US 2019/0379655 A1    Dec. 12, 2019

(30) Foreign Application Priority Data
Jun. 6, 2018    (JP) ................................ 2018-108639

(51) Int. Cl.
| | | |
|---|---|---|
| H04L 9/32 | (2006.01) | |
| H04L 9/08 | (2006.01) | |
| G06F 21/31 | (2013.01) | |
| G06F 21/60 | (2013.01) | |
| H04L 29/06 | (2006.01) | |

(52) U.S. Cl.
CPC ........ *H04L 63/0838* (2013.01); *G06F 21/602* (2013.01); *H04L 9/0891* (2013.01); *H04L 9/0894* (2013.01); *H04L 63/062* (2013.01); *H04L 63/067* (2013.01); *H04L 63/0892* (2013.01)

(58) Field of Classification Search
None
See application file for complete search history.

(56) References Cited

U.S. PATENT DOCUMENTS

| | | | |
|---|---|---|---|
| 2017/0064545 A1* | 3/2017 | Pedersen | H04L 63/062 |
| 2018/0123784 A1* | 5/2018 | Gehrmann | H04L 9/0891 |
| 2019/0052635 A1* | 2/2019 | Liu | H04L 9/0897 |

(Continued)

OTHER PUBLICATIONS

Design of Secure User Authenticated Key Management Protocol for Generic IoT Networks. Wazid et al. IEEE. (Year: 2018).*

(Continued)

*Primary Examiner* — Venkat Perungavoor
(74) *Attorney, Agent, or Firm* — McDermott Will & Emery LLP

(57) ABSTRACT

A data communication system has an IoT device, an information processing device capable of performing communication with the IoT device, and a server capable of performing communication with the IoT device and the information processing device. When a coupling request from the IoT device is received, the information processing device requests the server for a tentative common key which is temporarily valid. When a request for a tentative common key from the information processing device is received, the server generates a tentative common key and transmits the tentative common key to the information processing device. The information processing device transmits the received tentative common key to the IoT device, and the IoT device and the server perform authentication by using the tentative common key.

13 Claims, 15 Drawing Sheets

(56) References Cited

U.S. PATENT DOCUMENTS

2019/0156019 A1* 5/2019 Chen ................... H04L 67/12
2019/0253243 A1* 8/2019 Zimmerman ......... H04L 9/3247
2019/0289006 A1* 9/2019 Fang ................... H04L 29/08
2019/0313246 A1* 10/2019 Nix ..................... H04L 9/3263

OTHER PUBLICATIONS

IOT Gateway: Bridging Wireless Sensor Networks into Internet of Things. Zhu. IEEE. (Year: 2010).*
An IoT notion-based authentication and key agreement scheme ensuring user anonymity for heterogeneous ad hoc wireless sensor networks.Tai. Elsevier (Year: 2017).*
CN 110572828A. English Translation. (Year: 2019).*
HRF5 IoT SDK v0.9.0http://infocenter.nordicsemi.com/index.jsp?topic=%2Fcom.nordic.infocenter.iotsdk.v0.9.0%2Findex.html.

* cited by examiner

SYSTEM FOR IOT DEVICES COMMUNICATING WITH SERVER USING A TENTATIVE COMMON KEY

CROSS-REFERENCE TO RELATED APPLICATIONS

The disclosure of Japanese Patent Application No. 2018-108639 filed on Jun. 6, 2018 including the specification, drawings and abstract is incorporated herein by reference in its entirety.

BACKGROUND

The present invention relates to a data communication system.

In a system in which an IoT (Internet of Things) device performs data communication with a device such as a server, authentication information is necessary in data communication. The authentication information which becomes necessary when the IoT device performs data communication with a device such as a server is information which has to be shared by the IoT device and the server. Setting of authentication information to an IoT device is executed when an instruction is sent from a device having a user interface such as a smart device to an IoT device as an object.

The IoT device and the server cannot check if the other side to which authentication information is given is really the one to which the authentication information is to be given, for a reason such that they do not have a user interface. Therefore, authentication information is not directly given between an IoT device and a server, but authentication information is set in an IoT device via a device such as a smart device.

For example, in setting of coupling between a PC and a Wi-Fi router, the password of a Wi-Fi router has to be set in a PC. In this case, the password of the Wi-Fi router is not directly transmitted from the Wi-Fi router. A person directly enters the password of the Wi-Fi router to the PC. It is equivalent to a check that the other side (PC) to which authentication information (password) is given is really the one to which the authentication information is to be given. On the other hand, in the case of an IoT device, different from a PC, it does not have a user interface, so that a device such as a smart device is used instead.

In non-patent literature 1 (Software Development Kit regarding nRF5 IoT SDK v0.9.0 at infocenter.nordicsemi-.com), a system authenticating an IoT device and a server by using a smart device is described. In the non-patent literature 1, nRF52 corresponds to an IoT device. nRF52 does not have communication means to directly access the Internet but is coupled to an edge router by using the BLE communication. The edge router has the functions of BLE coupling and coupling to the Internet, and nRF52 is coupled to the Internet via the edge router. The edge router requests a password for coupling from nRF52. The password is information shared by nRF52 and the edge router and information which should not be leaked to a third party. The password is registered in advance in the edge router and is set in nRF52 by using a smart device.

SUMMARY

However, the system of the non-patent literature 1 has a problem such that since authentication information is held in a smart device at the time of setting the authentication information in an IoT device, there is a risk that the authentication information leaks to the outside by an attack to the smart device by a malicious third party or loss of the smart device.

The other problems and novel features will become apparent from the description of the specification and appended drawings.

According to an embodiment, when a smart device receives a coupling request from an IoT device, the smart device requests a server for a tentative common key which is temporarily valid. When the request for a tentative common key from the smart device is received, the server generates a tentative common key and transmits the tentative common key to the smart device. The smart device transmits the received tentative common key to the IoT device. The IoT device and the server perform authentication by using the tentative common key.

According to the embodiment, the risk of leak of authentication information to the outside due to an attack to a smart device by a malicious third party or loss of a smart device can be prevented.

DETAILED DESCRIPTION

Figure 1:
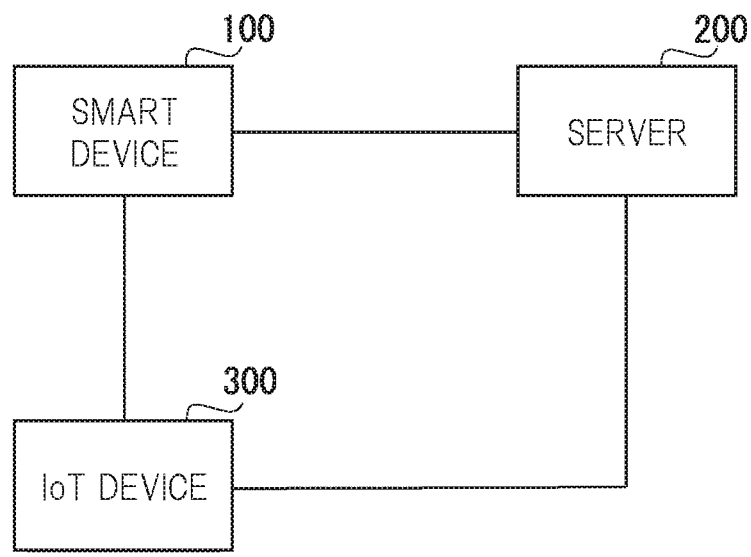
FIG. 1 is a block diagram illustrating the configuration of a control device according to outline of an embodiment.

For clarification of description, omission and simplification are properly made in the following description and drawings. Each of elements illustrated in the drawings as function blocks performing various processes can be comprised of a CPU, a memory, and other circuits as hardware, and is realized by a program or the like loaded to a memory as software. Therefore, a person skilled in the art understands that the function blocks can be realized in various forms of only hardware, only software, or combination of the hardware and software, and the invention is not limited to any of the forms. In the drawings, the same reference numeral is designated to the same element and repetitive description is omitted as necessary.

The above-described program is stored by using any of non-transitory computer readable media of various types and can be supplied to a computer. The non-transitory computer readable media include tangible storage media of various types. Examples of the non-transitory computer readable media include magnetic recording media (for example, flexible disk, magnetic tape, and hard disk drive), magnet-optic recording media (for example, magnet-optic disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). The program may be supplied to a computer by any of transitory computer readable media of various types. Examples of the transitory computer readable media include an electric signal, an optical signal, and an electromagnetic wave. The transitory computer readable medium can supply a program to a computer via a wired communication path such as an electric wire or an optical fiber or a wireless communication path.

OUTLINE OF EMBODIMENTS

FIG. 1 is a block diagram illustrating the configuration of a control device according to outline of embodiments. In FIG. 1, a data communication system 1 has a smart device 100, a server 200, and an IoT device 300.

The smart device 100 is a device capable of performing communication with the server 200 and the IoT server 300. When a coupling request from the IoT device 300 is received, the smart device 100 requests the server 200 for a tentative common key which is temporarily valid. The smart device 100 transmits the received tentative common key to the IoT device 300.

The server 200 is a server capable of performing communication with the smart device 100 and the IoT device 300. When a request of the tentative common key from the smart device 100 is received, the server 200 generates a tentative common key and transmits the tentative common key to the smart device 100.

The IoT device 300 is a device capable of performing communication with the smart device 100 and the server 200. The IoT device 300 receives the tentative common key transmitted from the smart device 100.

The IoT device 300 and the server 200 perform authentication by using the tentative common key.

As described above, according to the data communication system in the outline of the embodiment, a smart device requests a server for a temporarily common key which is temporary valid in response to a coupling request from an IoT device and transmits a tentative common key generated by the server to the IoT device. In such a manner, a risk can be prevented that authentication information leaks to the outside by an attack to the smart device by a malicious third party or loss of the smart device.

First Embodiment

Figure 2:
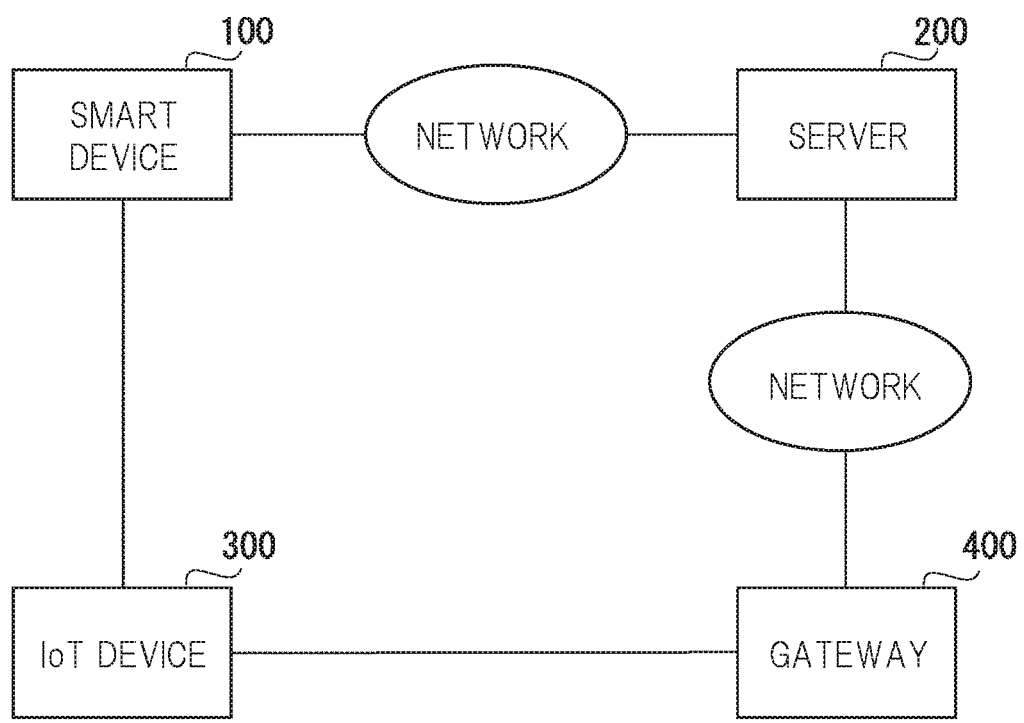
FIG. 2 is a block diagram illustrating the configuration of a data communication system according to a first embodiment.

In a first embodiment, the detailed configuration of the data communication system 1 described in the outline of the embodiments will be described. FIG. 2 is a block diagram illustrating the configuration of a data communication system according to a first embodiment. In FIG. 2, a data communication system 10 has the smart device 100, the server 200, the IoT device 300, and a gateway 400.

The smart device 100 is a device capable of performing communication with the server 200 and the IoT device 300. When a coupling request is received from the IoT device 300, the smart device 100 requests the server 200 for the tentative common key which is temporary valid. The smart device 100 transmits the received tentative common key to the IoT device 300.

The server 200 is a server capable of performing communication with the smart device 100 and the gateway 400. When a tentative common key request is received from the smart device 100, the server 200 generates a tentative common key and transmits the tentative common key to the smart device 100.

The IoT device 300 is a device capable of performing communication with the smart device 100 and the gateway 400. The IoT device 300 receives a tentative common key transmitted from the smart device 100.

The gateway 400 intermediates communication between the server 200 and the IoT device 300. The gateway 400 converts a signal and a protocol as necessary on the communication between the server 200 and the IoT device 300.

The IoT device 300 and the serer 200 perform authentication by using a tentative common key. In the case where the authentication succeeds, using the tentative common key as a public key of the server 200 of the public key cryptosystem, authentication information is transmitted/received by using the public key cryptosystem between the server 200 and the IoT device 300.

FIG. 2 illustrates an example that, in the case where the IoT device 300 cannot directly send/receive data to/from the server 200 due to different communication systems, the IoT device 300 sends/receives data to/from the server 200 via a device such as the gateway 400. Therefore, when the IoT device 300 has the function of performing communication directly with the server 200, the gateway 400 is not always necessary.

Figure 3:
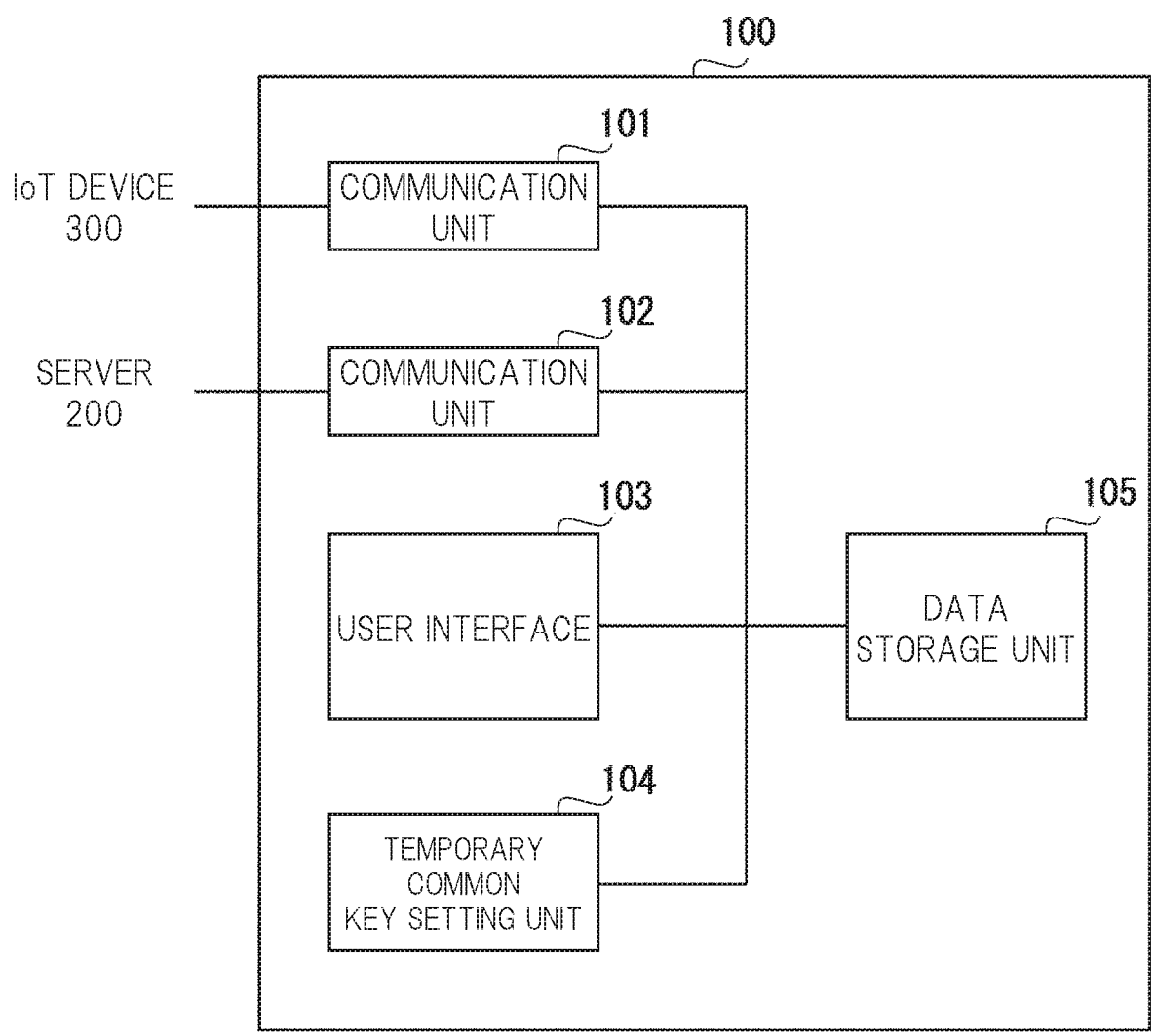
FIG. 3 is a block diagram illustrating the configuration of a smart device according to the first embodiment.

Next, the configuration of the smart device 100 will be described. FIG. 3 is a block diagram illustrating the configuration of a smart device according to the first embodiment. In FIG. 3, the smart device 100 has a communication unit 101, a communication unit 102, a user interface 103, and a tentative common key setting processing unit 104.

The communication unit 101 is a communication unit performing communication with the IoT device 300. For example, the communication unit 101 may be configured by a wireless communication circuit. When the communication unit 101 becomes able to communicate with the IoT device 300, the communication unit 101 notifies the user interface 103 of the existence of the IoT device 300.

The communication unit 102 is a communication unit performing communication with the server 200. For example, the communication unit 102 may be comprised of a wireless communication circuit. The communication unit 102 transmits a request for a tentative common key from the IoT device 300 to the server 200. The communication unit 102 receives the tentative common key transmitted from the server 200. Desirably, the communication unit 102 performs secure communication with the server 200.

The user interface 103 is an interface which receives an instruction from an operating person. The user interface 103 is an interface which displays information. For example, the user interface 103 may be configured by a touch panel. The user interface 103 displays the existence of an IoT device capable of performing communication. The user interface 103 receives selection of an IoT device capable of performing communication.

According to the instruction received by the user interface 103, the tentative common key setting processing unit 104 performs a process instructing authentication of the IoT device 300. The instruction is transmitted via the communication unit 101.

With the above configuration, the smart device 100 receives/transmits the authentication information of the IoT device 300.

The smart device 100 may be an information processing device capable of transmitting/receiving data to/from both the IoT device 300 and the server 200, having the user interface 103, and capable of selecting the IoT device 300 as a coupling destination. For example, the smart device 100 may be a notebook-type PC or a mobile PC. The smart device 100 includes a smartphone, a tablet device, a smart watch, a smart glass, and a wearable computer.

Figure 4:
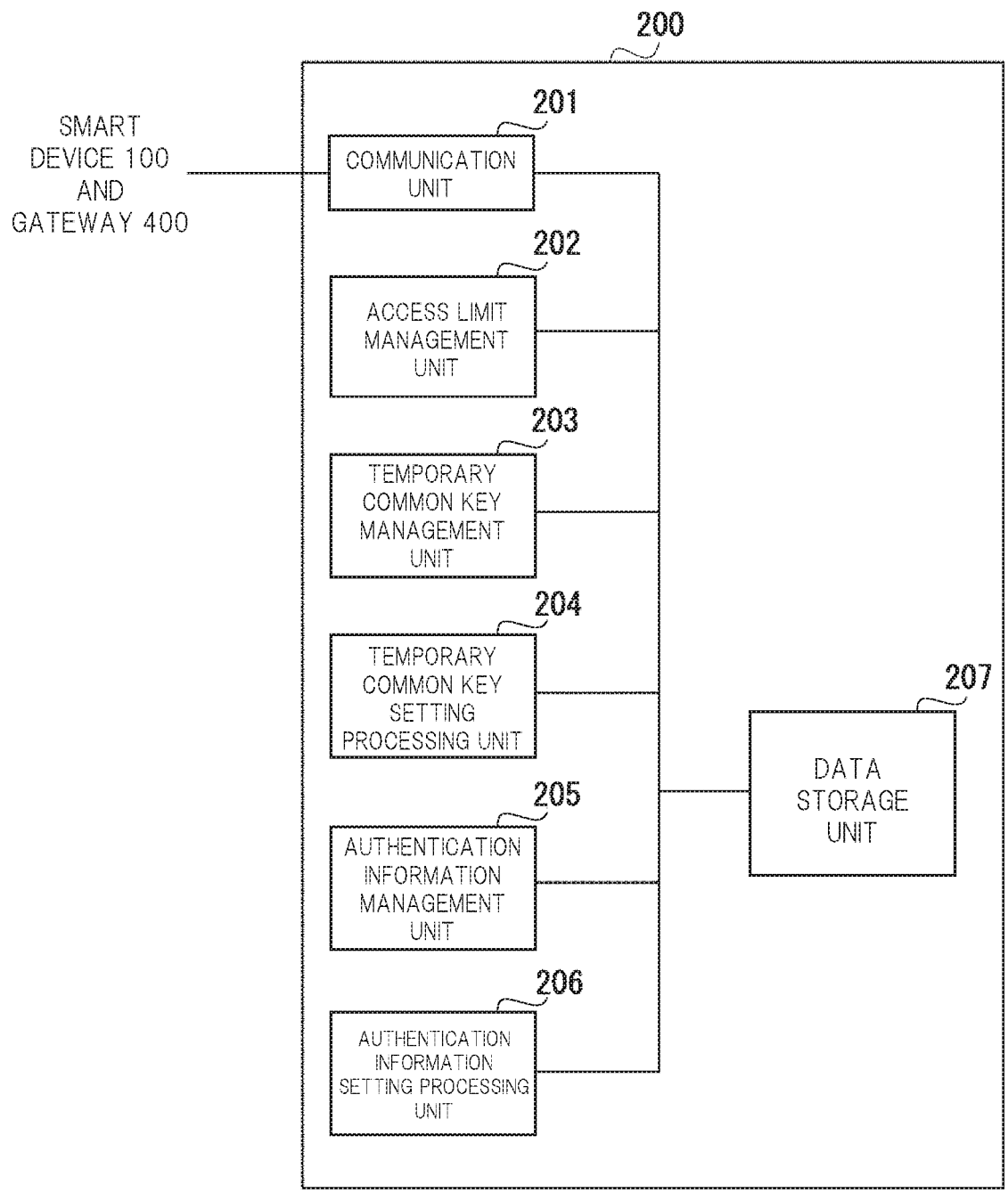
FIG. 4 is a block diagram illustrating the configuration of a server according to the first embodiment.

Next, the configuration of the server 200 will be described. FIG. 4 is a block diagram illustrating the configuration of a server according to the first embodiment. In FIG. 4, the server 200 has a communication unit 201, an access limit management unit 202, a tentative common key management unit 203, a tentative common key setting processing unit 204, an authentication information management unit 205, an authentication information setting processing unit 206, and a data storage unit 207.

The communication unit 201 is a communication unit performing communication with the smart device 100 and the gateway 400. For example, the communication unit 201 may be configured by a wired communication circuit.

The access limit management unit 202 requests authentication by user name, password, or the like for discharge of a tentative common key. The tentative common key is generated for each IoT device 300.

Referring to the data storage unit 207, the tentative common key management unit 203 manages the tentative common key which is set for each IoT device 300.

The tentative common key setting processing unit 204 discharges a tentative common key in response to a request from the smart device 100. For example, the tentative common key setting processing unit 204 may generate a tentative common key which varies request by request. Concretely, the tentative common key setting processing unit 204 may generate a tentative common key which is different from the tentative common key stored in the tentative common key management unit 203.

The authentication information management unit 205 manages authentication information which is set in each of the IoT devices 300 with reference to the data storage unit 207.

The authentication information setting processing unit 206 determines whether the authentication information is set in the IoT device 300 or not. For example, when any of the following conditions is met, the authentication information setting processing unit 206 may not set the authentication information in the IoT device 300.

a setting process for the IoT device 300 in which authentication information is already set the case where preset time lapses since a tentative common key corresponding to authentication information is discharged the case where a tentative common key which is not discharged is used Concretely, the authentication information setting processing unit 206 uses a tentative common key which varies each time. The authentication information setting processing unit 206 may determine whether a tentative common key at the time of an authentication request matches a tentative common key already used to transmit/receive authentication information with reference to the authentication information management unit 205. When the tentative common key at the time of the authentication request matches the tentative common key already used for transmitting/receiving authentication information, the authentication information setting processing unit 206 may instruct the communication unit 201 to reject communication and to reject transmission/reception of authentication information.

Concretely, the authentication information setting processing unit 206 may determine whether or not preset time elapsed since a tentative common key corresponding to authentication information is discharged with reference to the authentication information management unit 205. In the case where the preset time has elapsed since the tentative common key corresponding to the authentication information is discharged, the authentication information setting processing unit 206 may instruct the communication unit 201 to reject communication and to reject transmission/reception of the authentication information.

Concretely, the authentication information setting processing unit 206 may determine whether a tentative common key which is not discharged is used or not by referring to the authentication information management unit 205. In the case where a tentative common key which is not discharged is used, the authentication information setting processing unit 206 may instruct the communication unit 201 to reject communication and to reject transmission/reception of authentication information.

Regarding the above-described "preset time", in the case where a tentative common key is leaked, to prevent authentication information from being set in a false IoT device 300 before the authentication information is set in a legitimate IoT device 300, the valid period of the tentative common key which is managed by the server 200 is set to minimum time (for example, tens seconds) required for setting authentication information since a tentative common key is discharged.

The data storage unit 207 is a storage unit storing various data. Concretely, the data storage unit 207 is comprised of a memory circuit. The kind of the memory circuit is not limited. For example, the data storage unit 207 may store a tentative common key which is generated. The data storage unit 207 may store a combination of the generated tentative common key and the identifier of the IoT device 300. The data storage unit 207 may store the pattern of a tentative common key used for transmission/reception of authentication information. The data storage unit 207 may store a tentative common key already used for transmission/reception of authentication information. The data storage unit 207 may store time of discharge of a tentative common key. The data storage unit 207 may store a discharged tentative common key.

Figure 5:
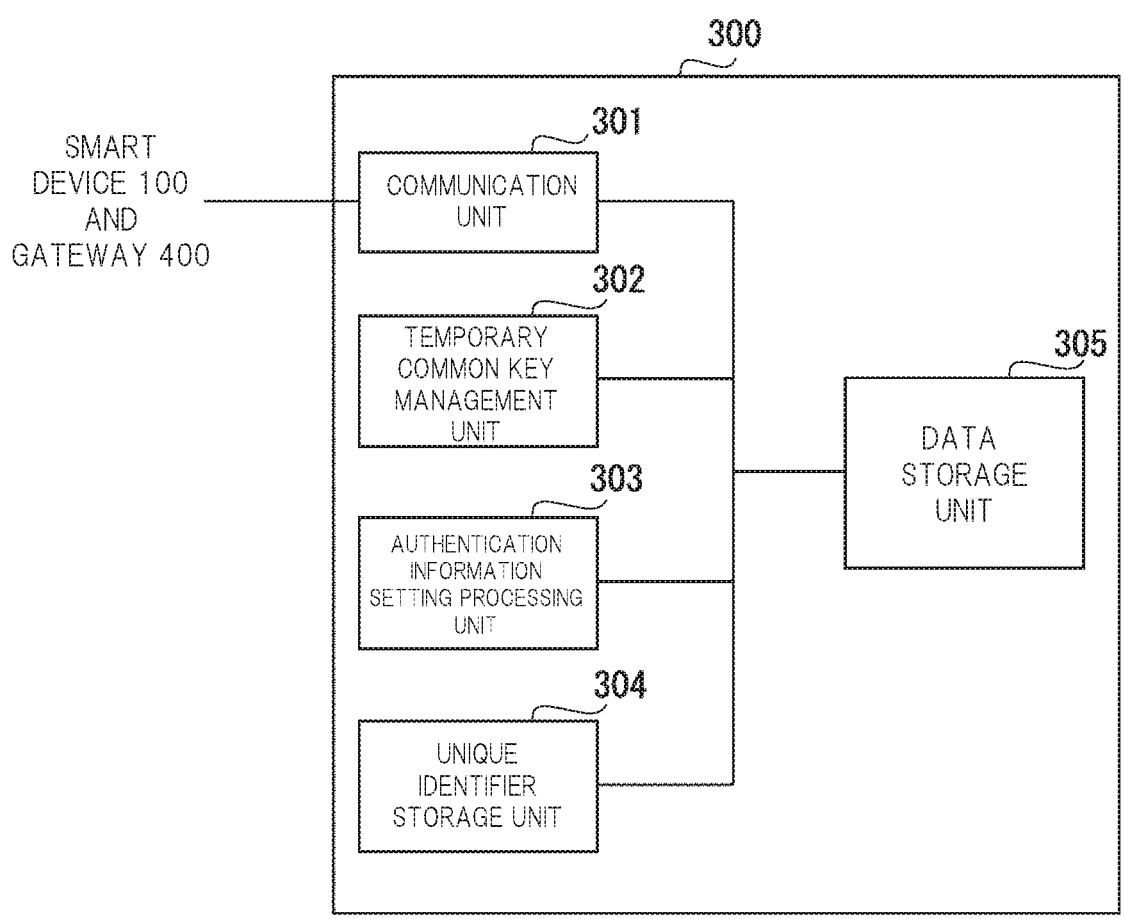
FIG. 5 is a block diagram illustrating the configuration of an IoT device according to the first embodiment.

Next, the configuration of the IoT device 300 will be described. FIG. 5 is a block diagram illustrating the configuration of the IoT device according to the first embodiment. In FIG. 5, the IoT device 300 has a communication unit 301, a tentative common key processing unit 302, an authentication information setting processing unit 303, a unique identifier 304, and a data storage unit 305.

The communication unit 301 is a communication unit performing communication with the smart device 100 and the gateway 400. For example, the communication unit 301 may be configured by a wireless communication circuit. Concretely, it may be configured by a wireless communication circuit having the near field communication function such as BLE (Bluetooth (registered trademark) Low Energy).

The tentative common key processing unit 302 performs a process of making a coupling request to the smart device 100 which can perform communication. The tentative common key processing unit 302 also performs a process of receiving a tentative common key from the smart device 100.

The authentication information setting processing unit 303 performs a process of transmitting/receiving authentication information to/from the server 200 by using the tentative common key. The authentication information setting processing unit 303 performs an authentication information setting process.

The unique identifier storage unit 304 stores a unique identifier for discriminating each IoT device 300.

The data storage unit 305 stores the tentative common key received from the smart device 100. The data storage unit 305 stores authentication information.

Figure 6:
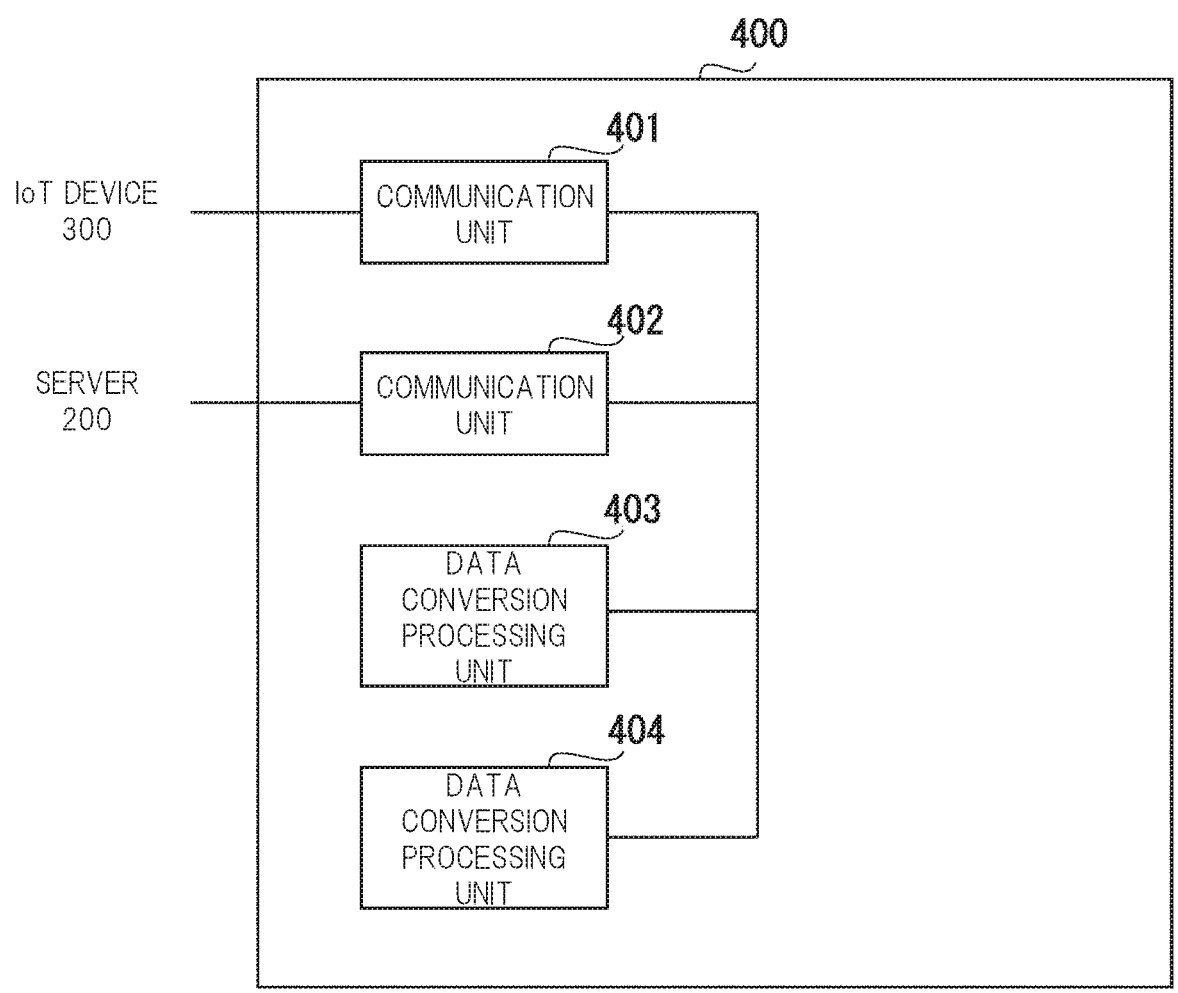
FIG. 6 is a block diagram illustrating the configuration of a gateway according to the first embodiment.

Next, the configuration of the gateway 400 will now be described. FIG. 6 is a block diagram illustrating the configuration of the gateway according to the first embodiment. In FIG. 6, the gateway 400 has a communication unit 401, a communication unit 402, a data conversion processing unit 403, and a data conversion processing unit 404.

The communication unit 401 is a communication unit performing communication with the IoT device 300. For example, the communication unit 401 may be configured by a wireless communication circuit.

The communication unit 402 is a communication unit performing communication with the server 200. For example, the communication unit 402 may be configured by a wireless communication circuit.

The data conversion processing unit 403 converts data transmitted from the IoT device 300 to data adapted to communication with the server 200. The converted data is transmitted from the communication unit 402.

The data converting processing unit 404 converts data transmitted from the server 200 to data adapted to communication with the IoT device 300. The converted data is transmitted from the communication unit 401.

With the above configuration, in the case where direct coupling to the server 200 cannot be performed on the ground of a communication device of the IoT device 300, data communication between the IoT device and a server is realized by mediation of data communication with the gateway 400.

Figure 7:
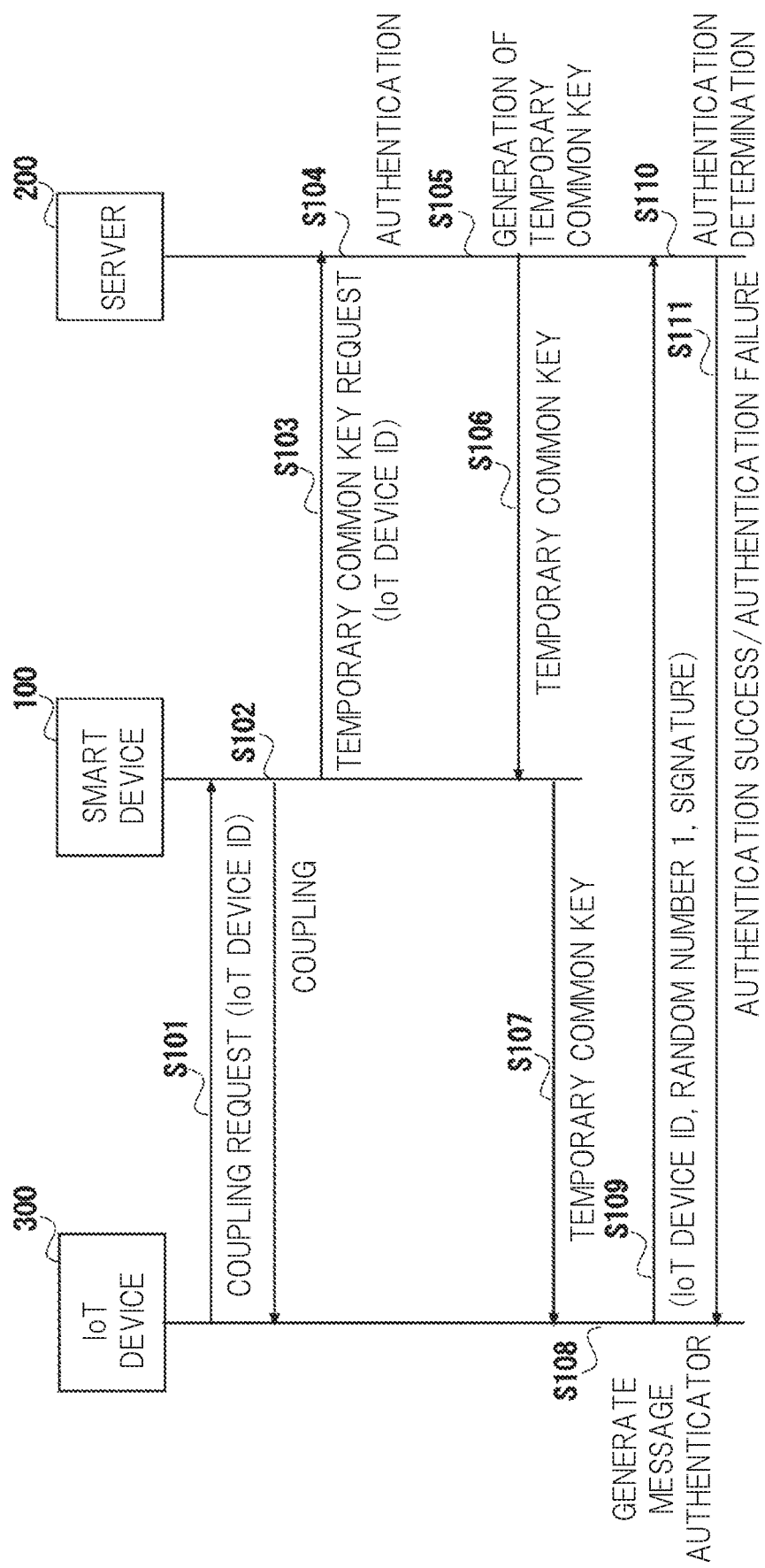
FIG. 7 is a sequence diagram illustrating an example of an authentication process of the data communication system according to the first embodiment.

With the above configurations of the smart device 100, the server 200, and the IoT device 300 (as necessary, the gateway 400), the data communication system 10 performs the authenticating process and transmission/reception of authentication information. Next, the operation of the data communication system 10 will be described. FIG. 7 is a sequence diagram illustrating an example of the authentication process of the data communication system according to the first embodiment. In FIG. 7, the authentication of the IoT device 300 using a tentative common key is performed.

As premises, the IoT device 300 has a unique identifier for identifying each IoT device 300, and the server 200 preliminarily stores a unique identifier of each of the IoT devices 300 and authentication information corresponding to the unique identifier. The server 200 manages a state of whether authentication information is set in each IoT device 300.

In a communication path between the smart device 100 and the IoT device 300, a tentative common key is transmitted/received and the IoT device 300 is authenticated by using a message authenticator with the tentative common key. The authentication in this case refers to a check to see that the tentative common key discharged from the server is correctly set in the IoT device 300 as an object in which authentication information is to be set.

The authenticating process is performed by the following procedure. First, in FIG. 7, the IoT device 300 transmits a coupling request and a unique identifier (hereinbelow, called "IoT device ID") to the smart device 100 (S101).

The smart device 100 receives the coupling request from the IoT device 300 and establishes a coupling to the IoT device 300 (S102). The smart device 100 selects and checks the IoT device 300 as a coupling destination from the smart device 100, thereby preventing masquerading of the IoT device 300.

After coupling between the smart device 100 and the IoT device 300 is established, the smart device 100 requests the server 200 for a tentative common key which is to be set in the IoT device 300 as an object to be operated (S103).

The server 200 authenticates the smart device 100. The authentication is, for example, access limit by a user name and a password. Although it is assumed that the authentication is application of Basic Authentication or the like, the method of authentication is not limited. Any method may be employed as long as unspecified number of third parties cannot arbitrarily request issue of a tentative common key (S104).

The server 200 generates a tentative common key which is set in the IoT device 300 designated by the smart device 100 as a public key of the public key cryptosystem for each IoT device 300 (S105).

The server 200 transmits the generated tentative common key to the smart device 100 (S106).

The smart device 100 transmits the received tentative common key to the IoT device 300 (S107).

The IoT device 300 generates random number 1. The IoT device 300 generates a message authenticator by using the random number 1 and a tentative common key (S108).

The IoT device 300 transmits the random number 1 and the message authenticator to the server 200 in a communication path of the server 200 and the IoT device 300 (S109).

The server 200 generates a message authenticator by using the tentative common key discharged to the smart device 100 and the random number 1 received from the IoT device 300. The server 200 compares the generated message authenticator with the message authenticator received from the IoT device 300 (S110).

A comparison result of the message authenticators is notified to the IoT device 300 (S111). When the generated message authenticator and the message authenticator received from the IoT device 300 match, it is assured that the IoT device 300 as a communication partner is the IoT device 300 in which the tentative common key is set by the procedures from S101 to S107.

In the description of the procedure of S101 to S107 in FIG. 7, it is assumed that the IoT device ID for identifying the IoT device 300 is preliminarily held in the IoT device 300. Alternatively, it may be an ID set in the IoT device 300 from the smart device 100.

Although coupling is requested from the IoT device 300 to the smart device 100 in FIG. 7, on the contrary, coupling may be requested from the smart device 100 to the IoT device 300. The IoT device ID may be finally allocated to the IoT device 300 by selecting a proper method according to the communication method used between the IoT device 300 and the smart device 100.

Figure 8:
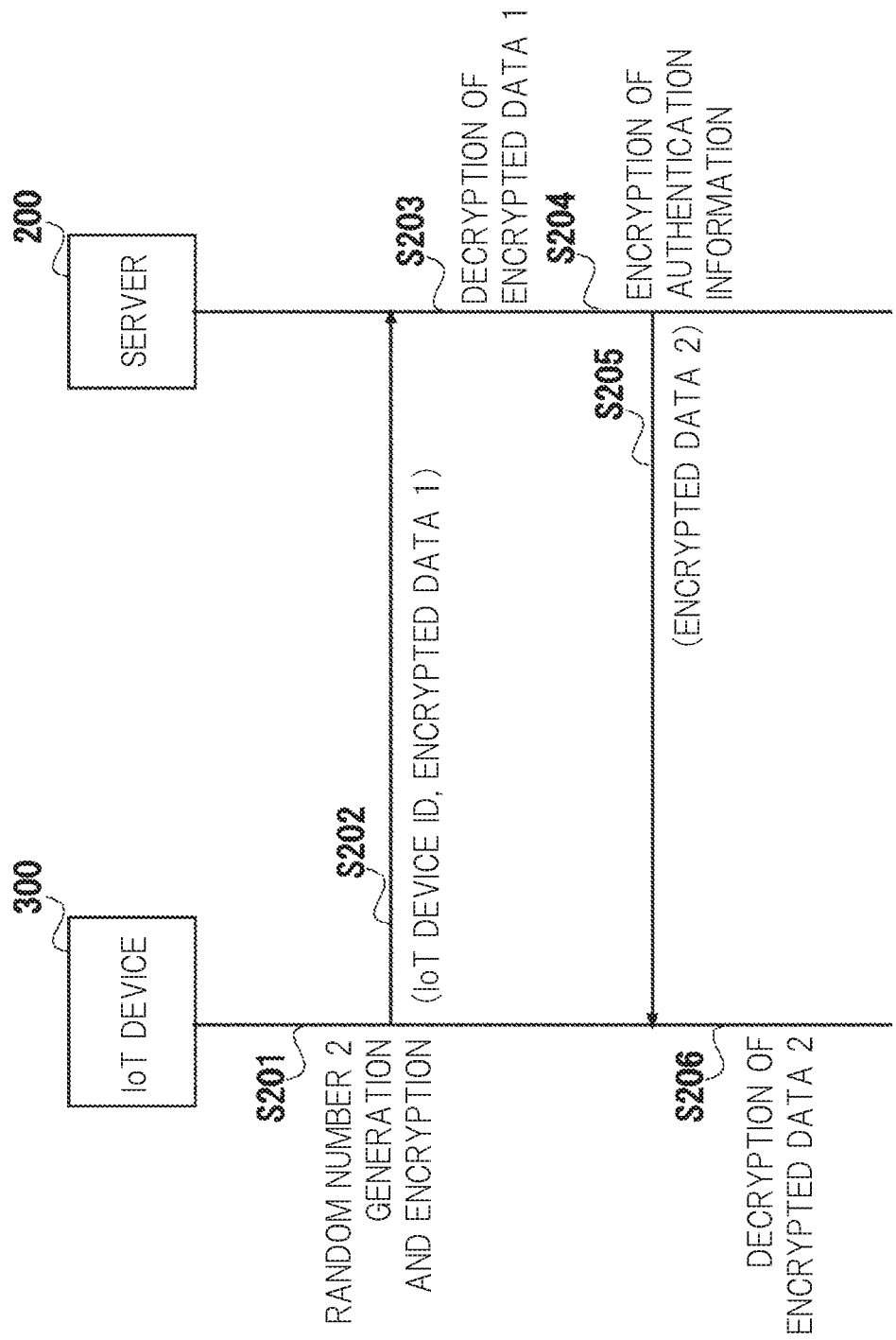
FIG. 8 is a sequence diagram illustrating an example of transmission/reception of authentication information of the data communication system according to the first embodiment.

By the above operation, the authenticating process is performed. After the authenticating process, the IoT device 300 holds the public key of the server 200 given as a tentative common key. The server 200 has a private key which is paired with the public key. Using the public key and the private key, the authentication information is transmitted/received between the server 200 and the IoT device 300 by the public key cryptosystem. Next, transmission/reception of the authentication information will be described. FIG. 8 is a sequence diagram illustrating an example of transmission/reception of authentication information of the data communication system according to the first embodiment.

The authentication information transmitting/receiving process is performed by the following procedure. In FIG. 8, first, the IoT device 300 generates random number 2. The IoT device 300 encrypts the random number 2 by using the tentative common key as an encryption key of the public key cryptosystem (S201).

Next, the IoT device 300 transmits the encrypted data (hereinbelow, encrypted data 1) to the server 200 (S202).

The server 200 decrypts the received encrypted data 1 by using a private key corresponding to the tentative common key. As a result, the server 200 can obtain the random number 2 (S203).

The server 200 encrypts the authentication information by the random number 2 (S204).

The server 200 transmits the encrypted data (hereinbelow, called encrypted data 2) to the IoT device 300 (S205).

The IoT device 300 obtains authentication information by decrypting the received encrypted data 2 by the random number 2 (S206).

By the above operation, sharing of the authentication information issued by the server between the server 200 and the IoT device 300 is completed.

In S201 to S206 in FIG. 8, a so-called "hybrid encrypting method" is used. At the time of transmitting authentication information from the server 200 to the IoT device 300, by encrypting the authentication information with the private key held by the server 200 and transmitting the encrypted information, the encrypted information can be decrypted by the public key held by the IoT device 300. Since the public key held by the IoT device 300 is transmitted as a tentative common key from the smart device 100, in the case where the tentative common key leaks from the smart device 100, the authentication information can be decrypted. To prevent it, it is desirable to use the hybrid encrypting method.

By executing the above procedure, safety of the authentication information can be enhanced. Concretely, for the following reasons, the safety of the authentication information can be increased.

1. Authentication information is not transmitted to a device other than the server 200 and the IoT device 300.
2. Since masquerading of the IoT device 300 is prevented by the procedure of S201 to S206, authentication information is not set in a false IoT device trying to do masquerading during execution of the procedure of S201 to S206.
3. A tentative common key cannot be arbitrarily obtained from the server 200 by unspecified number of people and cannot be obtained as long as authentication information such as the user name of the server 200 and password is known.
4. If a tentative common key leaks from the smart device 100, the server 200 does not set authentication information which is already subjected to the setting process in the IoT device 300, so that the leaked tentative common key cannot be used for setting of the authentication information.
5. In the case where a tentative common key is leaked from the smart device 100 and authentication information is not set in a legitimate IoT device 300 by using the leaked tentative common key, the tentative common key becomes invalid after lapse of time which is preliminarily set in the server 200 after it is discharged from the server 200. Consequently, by setting the minimum time necessary for regular procedure, a process of setting illegal authentication information by leakage of a tentative common key is prevented.
6. Since the authentication information is encrypted by using the public key cryptosystem in combination with the random number generated by the IoT device 300 and the encrypted information is transmitted between the server 200 and the IoT device 300, only the server 200 and the IoT device 300 can decrypt the authentication information.

As described above, according to the data communication system of the first embodiment, a smart device does not handle authentication information but performs only transmission/reception of a tentative common key for setting authentication information to/from a server. Consequently, even if a smart device is lost, there is no risk of leakage of authentication information.

As conditions of temporarily validating a tentative common key, any of the following conditions may be applied. Alternatively, some or all of the following conditions may be applied.

A tentative common key which varies each time is used.

After transmission/reception of authentication information is completed, a tentative common key used for the transmission/reception of the authentication information is made invalid.

Also in the case where transmission/reception of authentication information is not completed within predetermined time, a tentative common key is made invalid.

As described above, according to the data communication system of the first embodiment, by using a tentative common key which varies each time and, after transmission/reception of authentication information is completed, invalidating a tentative common key used for the transmission/reception of the authentication information, even if a malicious third party gets a smart device after transmission/reception of authentication information, the tentative common key stored in the smart device is already made invalid, so that no problem occurs from the viewpoint of security.

According to the data communication system of the first embodiment, also in the case where transmission/reception of authentication information is not completed within predetermined time, by invalidating a tentative common key, even if a malicious third party gets a smart device before the transmission/reception of the authentication information, certain time is necessary to take a tentative common key stored in the smart device by some means. The tentative common key becomes invalid during the time, so that no problem occurs from the viewpoint of security.

Second Embodiment

In a second embodiment, an example will be described in which when a smart device becomes able to perform communication with an IoT device, the IoT device which becomes able to perform communication as an object to which an authenticating process is instructed will be described.

The smart device of the second embodiment may have a configuration similar to that of the smart device of the first embodiment illustrated in FIG. 3. The user interface 103 may be omitted from the smart device 100 of FIG. 3.

Further, when communication with the IoT device 300 becomes possible, the communication unit 101 notifies the tentative common key setting processing unit 104 of the IoT device 300 which becomes able to perform communication.

The tentative common key setting processing unit 104 performs a process of instructing authentication of the IoT device 300 which becomes able to perform communication. The instruction is transmitted via the communication unit 102.

As described above, according to the data communication system of the second embodiment, by making a smart device close to an IoT device to be operated, the IoT device to be operated can be designated expressly. Consequently, a user interface for selecting an IoT device as a coupling destination from a smart device can be made unnecessary.

It is desirable that the communication unit 101 employs a communication system adapted to near field communication. For example, the communication unit 101 may use NFC (Near Field Communication) such as ISO/IEC 14443, ISO/IEC 18092, ISO/IEC 15693, and ISO/IEC 21481 (NFC IP-2) for data communication between the smart device 100 and the IoT device 300.

Third Embodiment

Figure 9:
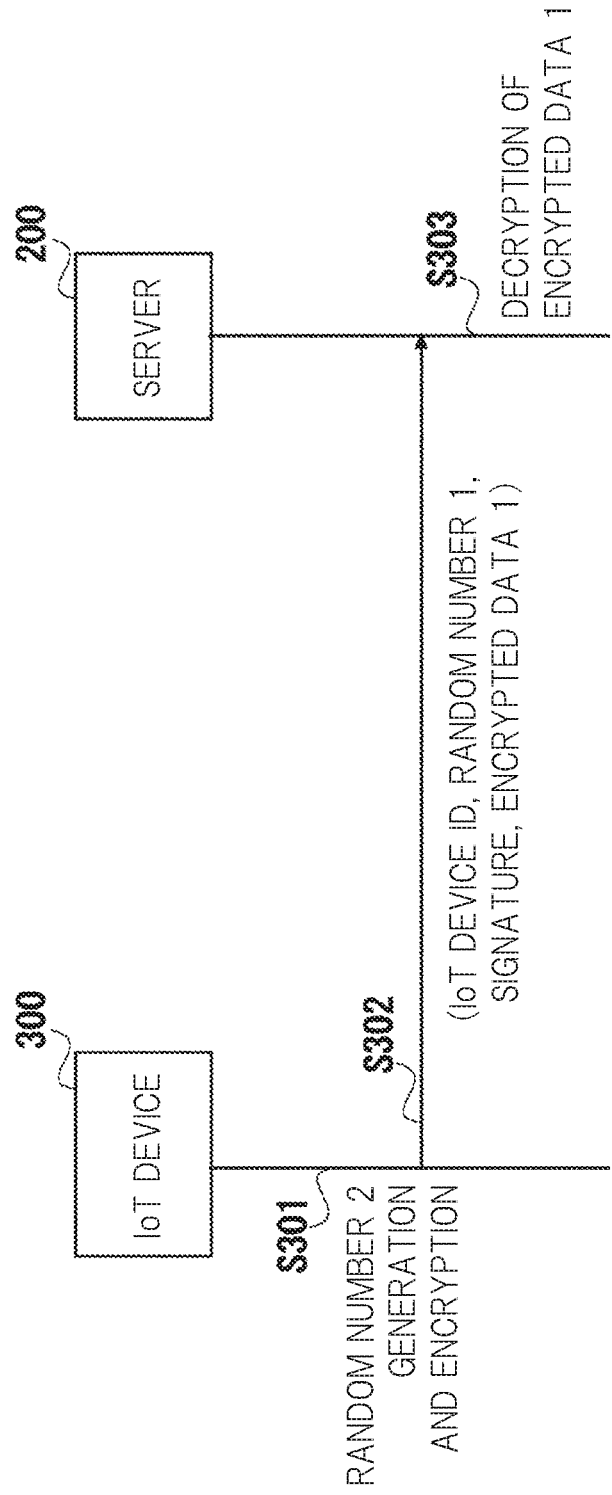
FIG. 9 is a sequence diagram illustrating an example of transmission/reception of authentication information of a data communication system according to a third embodiment.

In a third embodiment, an example will be described in which when authentication information shared by a server and an IoT device is a common key, by simultaneously transmitting authentication data of the IoT device by a tentative common key and a common key generated by the IoT device, authentication of the IoT device and sharing of authentication information between the IoT device and the server is performed at once. FIG. 9 is a sequence diagram illustrating an example of transmission/reception of authentication information of a data communication system according to the third embodiment. The sequence diagram of FIG. 9 illustrates processes after the processes until S108 in FIG. 7 are performed.

Authentication information is transmitted/received by the following procedure. In FIG. 9, first, the IoT device 300 generates random number 1, generates a message authenticator (hereinbelow, signature) from a tentative common key and the random number 1, and generates random number 2. The IoT device 300 encrypts the random number 2 (hereinbelow, encrypted data 1) by using a tentative common key as a public key of the public key cryptosystem (S301).

Next, the IoT device 300 transmits the IoT device ID, the random number 1, the signature, and the encrypted data 1 to the server 200 (S302).

The server 200 generates a message authenticator from the tentative common key and the random number 1 and compares it with the signature received from the IoT device 300. When the generated message authenticator and the received signature match, the server 200 recognizes an authentication success, decrypts the encrypted data 1 by using a private key corresponding to the tentative common key, and obtains the random number 2. The random number 2 is a common key shared by the IoT device 300 and the server 200 (S303).

As described above, according to the data communication system of the third embodiment, also in a system in which data communication in the direction from a server to an IoT device is not performed, authentication can be executed.

The data communication system of the third embodiment can be applied according to the specifications of a system configured and constraint conditions of devices used. For example, also in a system in which an IoT device notifies a server of a beacon using Bluetooth low energy and data communication in the direction from a server to an IoT device is not performed, the data communication system of the third embodiment can be applied.

Fourth Embodiment

Figure 10:
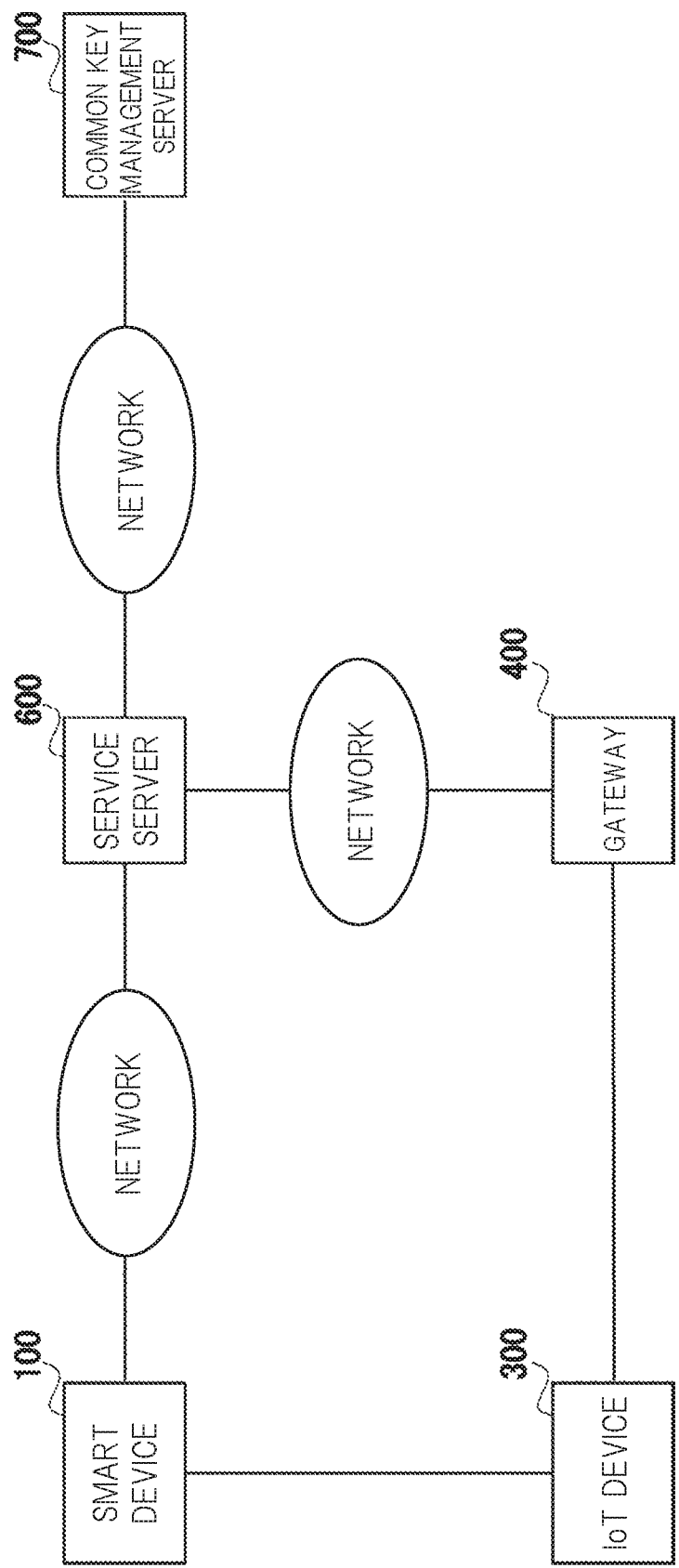
FIG. 10 is a block diagram illustrating the configuration of a data communication system according to a fourth embodiment.

In a fourth embodiment, an example will be described in which in a system performing data communication between an IoT device and a server, a device of performing encryption and signature by a common key of data transmitted/received between the IoT device and the server is set as external service. FIG. 10 is a block diagram illustrating the configuration of a data communication system according to the fourth embodiment. In FIG. 10, a data communication system 20 has the smart device 100, the IoT device 300, the gateway 400, a service server 600, and a common key management server 700.

The difference from the first embodiment is that the part corresponding to the server 200 is configured by two parts of the service server 600 and the common key management server 700.

Figure 11:
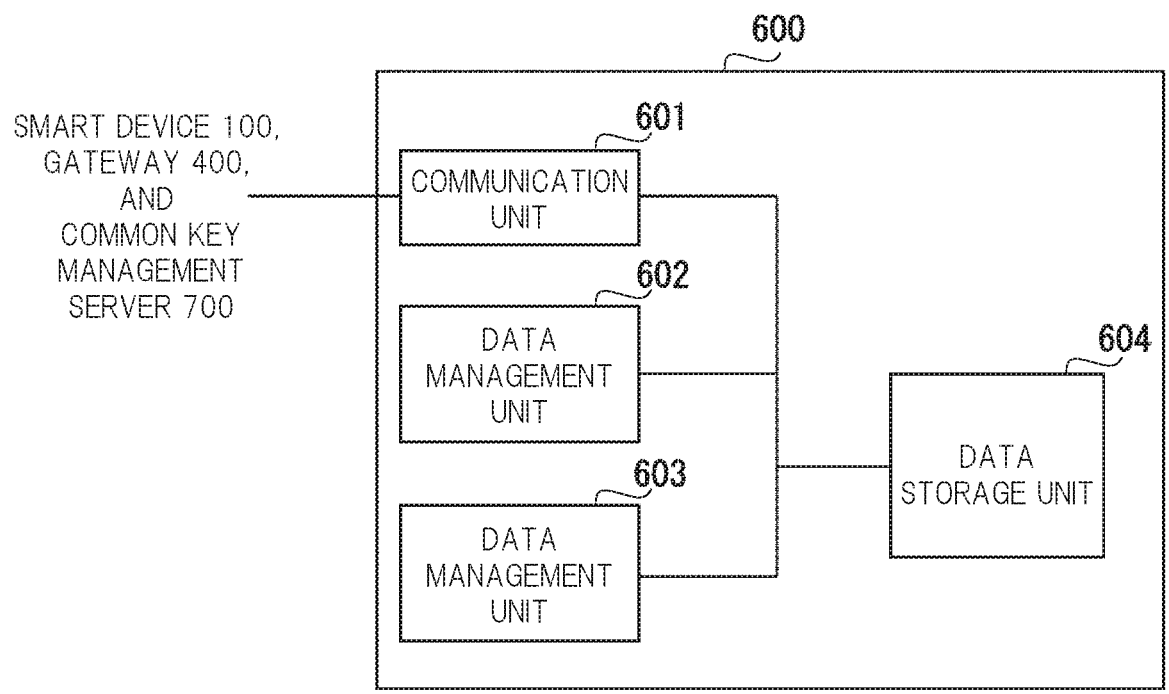
FIG. 11 is a block diagram illustrating the configuration of a service server according to the fourth embodiment.

FIG. 11 is a block diagram illustrating the configuration of a service server according to the fourth embodiment. In FIG. 11, the service server 600 has a communication unit 601, a data management unit 602, a data processing unit 603, and a data storage unit 604.

The communication unit 601 performs data communication with the smart device 100, the gateway 400, and the common key management server 700.

The data management unit 602 handles data collected from the IoT device 300.

The data processing unit 603 transfers a process to the common key management server 700 to decrypt encrypted data.

The data storage unit 604 stores data collected from the IoT device 300.

Figure 12:
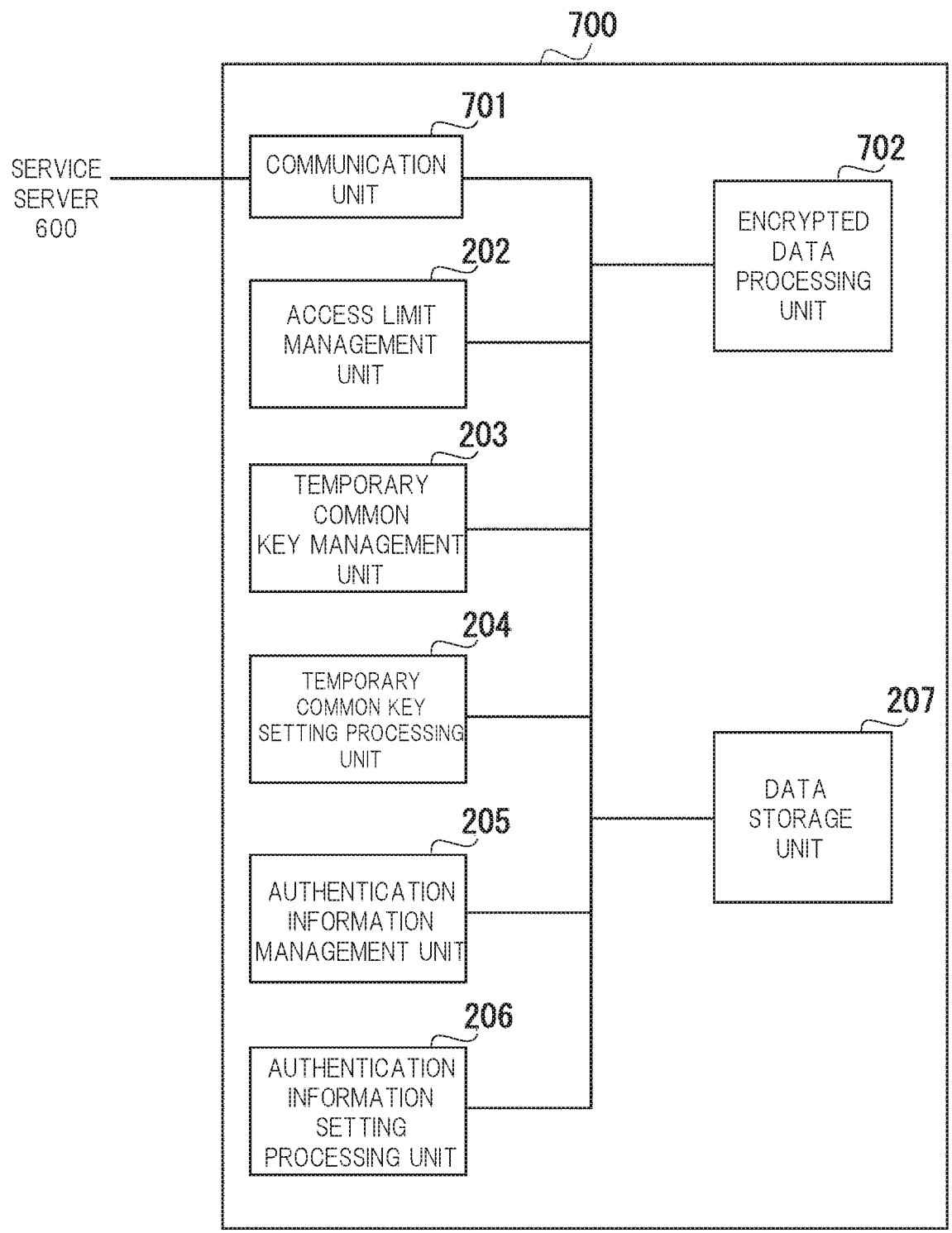
FIG. 12 is a block diagram illustrating the configuration of a common key management server according to the fourth embodiment.

FIG. 12 is a block diagram illustrating the configuration of a common key management server according to the fourth embodiment. In FIG. 12, the common key management server 700 has a communication unit 701, the access limit management unit 202, the tentative common key management unit 203, the tentative common key setting processing unit 204, the authentication information management unit 205, the authentication information setting processing unit 206, the data storage unit 207, and an encrypted data processing unit 702.

The communication unit 701 performs communication with the service server 600. For example, the communication unit 701 may be configured by a wired communication circuit.

The access limit management unit 202 requests authentication by user name, password, or the like for discharge of a tentative common key. A tentative common key is generated for each IoT device 300.

The tentative common key management unit 203 manages a tentative common key set in each IoT device 300 with reference to the data storage unit 207.

The tentative common key setting processing unit 204 discharges a tentative common key in response to a request from the smart device 100. For example, the tentative common key setting processing unit 204 may generate a tentative common key which varies for each request. Concretely, the tentative common key setting processing unit 204 may generate a tentative common key different from a tentative common key stored in the tentative common key management unit 203.

The authentication information management unit 205 manages authentication information to be set in each IoT device 300 with reference to the data storage unit 207.

The authentication information setting processing unit 206 determines whether authentication information is set in the IoT device 300 or not.

The encrypted data processing unit 702 decrypts encrypted data and verifies a signature in response to a request from the service server 600.

The data storage unit 207 is a storage unit storing various data.

Figure 13:
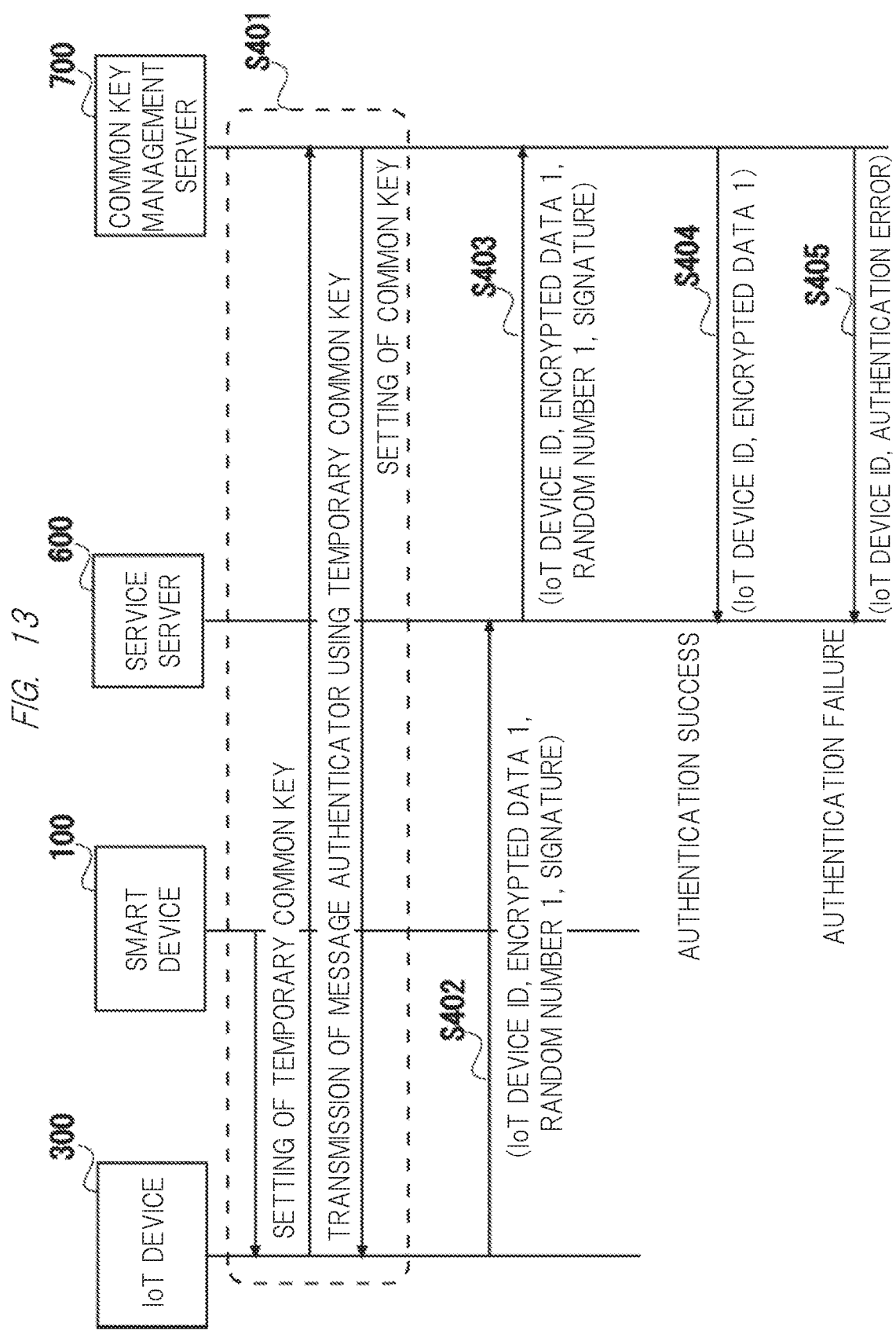
FIG. 13 is a sequence diagram illustrating an example of common key management of the data communication system according to the fourth embodiment.

Next, the operation of the data communication system 20 will be described. FIG. 13 is a sequence diagram illustrating an example of common key management of the data communication system according to the fourth embodiment.

The common key management is performed by the following procedure. In FIG. 13, first, the IoT device 300 and the common key management server 700 share a common key. As a common key sharing method, the method of the first embodiment is used (S401).

Subsequently, the IoT device 300 encrypts data to be transmitted to the service server 600 by a common key (hereinbelow, encrypted data 1). The IoT device 300 transmits, to the service server 600, IoT device ID, encrypted data 1, random number 1, and signature as a signature obtained by generating random number 1 and encrypting it with a common key (S402).

Although the IoT device 300 encrypts data to be transmitted, when encryption of data to be transmitted is unnecessary, it is unnecessary to encrypt the data. It is assured that masquerading and falsification is not performed on data transmitted with a message authenticator generated by using random number 1 and a common key.

The service server 600 transmits received data to the common key management server 700 (S403).

The common key management server 700 verifies signature by using a common key corresponding to IoT device ID. When a verification result is correct, it is regarded that authentication succeeds, encrypted data 1 is decrypted with the common key (hereinbelow, decrypted data 1), and the decrypted data is transmitted to the service server 600. The service server 600 receives the encrypted data 1. The decrypted data 1 is the same as plain text data which is transmitted from the IoT device 300 and is not encrypted.

As described above, according to the data communication system of the fourth embodiment, service and encryption/decryption of data transmitted/received between an IoT device and a server can be separated as independent functions.

For example, a service as an original purpose of a communication system of consolidating values of a temperature sensor and the like coupled to an IoT device to a server and performing management, analysis, and the like on the values, and a service of encrypting/decrypting data which is transmitted/received between the IoT device and the server can be separated as independent functions. As a result, external services can be used as the common key management functions independent from the communication system of the IoT device 300 and the service server 600.

Fifth Embodiment

In a fifth embodiment, prior to setting of authentication information, an authorization server is inquired whether or not authentication information may be set in an IoT device as an object in which authentication information is to be set.

Figure 14:
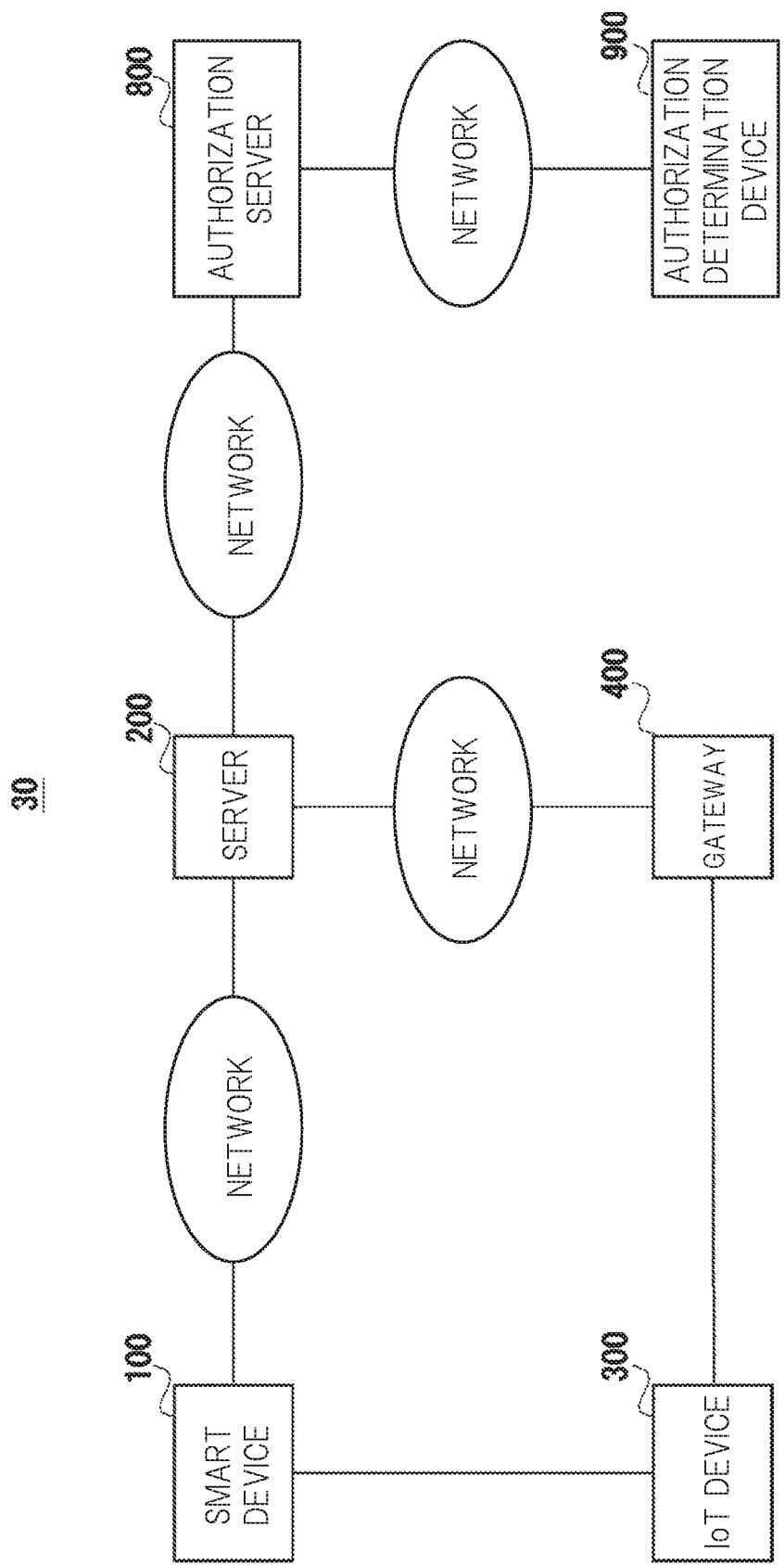
FIG. 14 is a block diagram illustrating the configuration of a data communication system according to a fifth embodiment.

FIG. 14 is a block diagram illustrating the configuration of a data communication system according to the fifth embodiment. In FIG. 14, a data communication system 30 has the smart device 100, the server 200, the IoT device 300, the gateway 400, an authorization server 800, and an authorization determination device 900.

Figure 15:
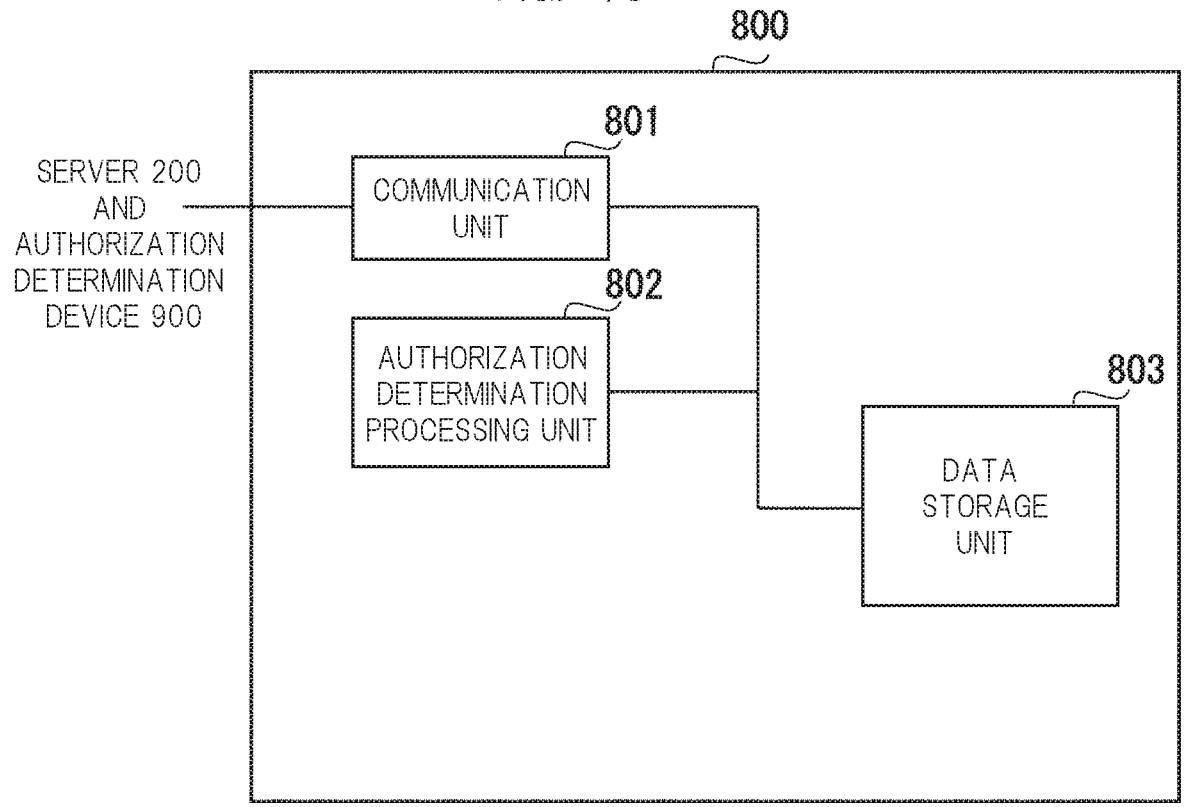
FIG. 15 is a block diagram illustrating the configuration of an authorization server according to the fifth embodiment.

FIG. 15 is a block diagram illustrating the configuration of an authorization server according to the fifth embodiment. In FIG. 15, the authorization server 800 has a communication unit 801, an authorization determination processing unit 802, and a data storage unit 803.

The communication unit 801 is a communication unit performing communication with the server 200 and the authorization determining device 900.

The authorization determination processing unit 802 determines whether authorization information may be set in the IoT device 300 as an object in which authorization information is to be set.

The data storage unit 803 is a storage unit storing various data. For example, the data storage unit 803 stores information necessary for setting and determination of authentication information.

Figure 16:
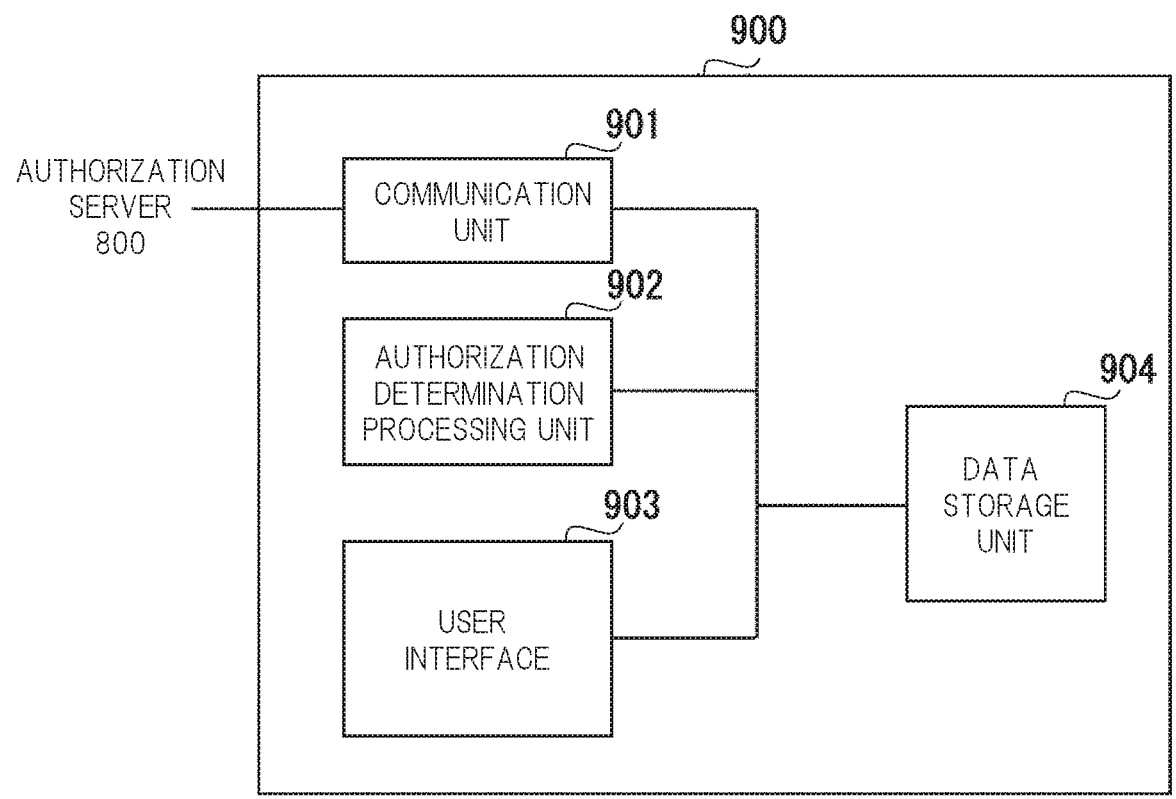
FIG. 16 is a block diagram illustrating the configuration of an authorization determination device according to the fifth embodiment.

FIG. 16 is a block diagram illustrating the configuration of an authorization determination device according to the fifth embodiment. In FIG. 16, the authorization determination device 900 has a communication unit 901, an authorization determination processing unit 902, a user interface 903, and a data storage unit 904.

The communication unit 901 is a communication unit performing data communication with the authorization server 800.

The authorization determination processing unit 902 determines whether authentication information can be set or not. Concretely, the authorization determination processing unit 902 determines whether authentication information can be set or not in accordance with the instruction received by the user interface 903.

The user interface 903 is an interface receiving an instruction from an operating person. The user interface 903 is an interface which displays information. For example, the user interface 903 may be comprised of a touch panel. The user interface 903 displays an IoT device 300 on which permission/rejection of setting of authentication information is determined and receives an instruction of whether authentication information is set in the IoT device 300 or not.

The data storage unit 904 is a storage unit storing various data.

With the above configuration, the authorization determination device 900 notifies the authorization server 800 of whether authentication information can be set or not.

The kind of person/machine of making determination of whether authentication information can be set in the authorization server is not limited. For example, the determination of whether the authentication information can be set or not may be performed by the following methods.

Notification is sent to a preliminarily designated PC or smartphone and the user (person having authority over setting) makes determination.

Determination by automatic setting such as rejection after lapse of predetermined time since a tentative common key is discharged.

Figure 17:
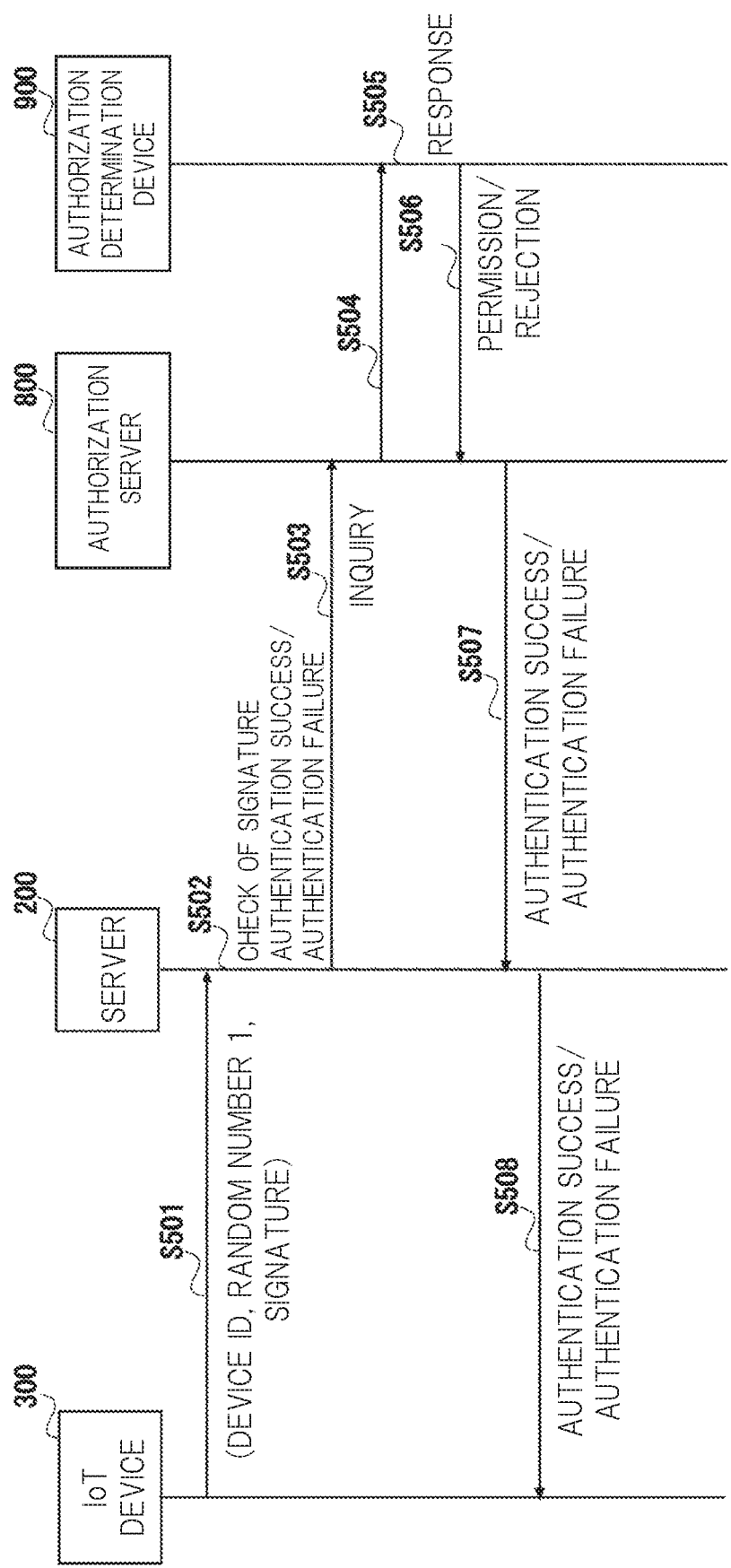
FIG. 17 is a sequence diagram illustrating an example of transmission/reception of authentication information of the data communication system according to the fifth embodiment.

Next, the operation of transmitting/receiving authorization information will be described. FIG. 17 is a sequence diagram illustrating an example of transmission/reception of authentication information of the data communication system according to the fifth embodiment.

A process of transmitting/receiving authentication information is performed by the following procedure. First, in FIG. 17, the IoT device 300 generates random number 1 and generates a message authenticator by using the random number 1 and a tentative common key. The IoT device 300 transmits a unique identifier of the IoT device 300, the random number 1, and a message authenticator to the server in a communication path between the server 200 and the IoT device 300 (S501).

Subsequently, the server 200 verifies a message authenticator received from the IoT device 300 by using a tentative common key discharged to the smart device 100 (S502).

When the verification result is correct, the server 200 sends an inquiry of whether or not authentication information may be set to the authorization server 800 (S503).

The authorization server 800 determines whether or not authentication information may be set in an IoT device by a preliminarily set method. For example, a check is made to see whether authentication information may be set or not by transmitting a check notification request to the authorization determination device 900 which is preliminarily registered (S505). In place of the above-described check in the authorization determination device 900, a method of making determination under a preliminarily set condition such as rejection when predetermined time lapses since a tentative common key is discharged, rejection of a specific IoT device ID, or rejection depending on time zones may be employed.

The authorization server 800 transmits permission/rejection of setting of authentication information to the server 200 (S106).

When permission of setting of authentication information is received from the authorization server 800, the server 200 sets the authentication information (S507).

When permission of setting of authentication information is received from the server 200, the server 200 sets the authentication information (S508).

As described above, according to the data communication system of the fifth embodiment, before authentication information is set, a check of whether the authentication information may be set in the IoT device 300 as an object in which authentication information is to be set is made to the authorization server 800. It can enhance prevention of leakage of authentication information.

According to the data communication system of the fifth embodiment, by separating the authentication information setting process and the authority of designing authentication information, prevention of leakage of authentication information can be enhanced.

Although the present invention achieved by the inventors herein has been described concretely above on the basis of the embodiments, obviously, the present invention is not limited to the foregoing embodiments and can be variously changed without departing from the gist. The first to fifth embodiments may be combined.

What is claimed is:

1. A data communication system comprising:
    an IoT device;
    an information processing device that performs communication with the IoT device; and
    a server that communicates with the IoT device and the information processing device,
    wherein when a coupling request from the IoT device is received, the information processing device transmits a request to the server for a tentative common key which is temporarily valid,
    wherein when the request for the tentative common key from the information processing device is received, the server generates the tentative common key and transmits the generated tentative common key to the information processing device,
    wherein the information processing device transmits the generated tentative common key received from the server to the IoT device,
    wherein the IoT device and the server perform authentication by using the tentative common key,
    wherein when authentication succeeds, using the generated tentative common key as a public key, authentication information is transmitted/received by using public key cryptosystem between the server and the IoT device,
    wherein the server stores the generated tentative common key and generates a tentative common key different from the stored tentative common key.

2. The data communication system according to claim 1, wherein the server generates a tentative common key which varies every request.

3. The data communication system according to claim 1, wherein the server uses the tentative common key at the time of authentication and, after that, invalidates the tentative common key.

4. The data communication system according to claim 3, wherein the server is configured to:
    store a pattern of the tentative common key after use for authentication;
    determines whether the tentative common key at the time of the authentication request matches the stored tentative common; and
    when the tentative common key at the time of the authentication request matches the stored tentative common key, reject communication.

5. The data communication system according to claim 1, wherein in a case where a predetermined period lapsed since the tentative common key is generated, the server invalidates the tentative common key.

6. The data communication system according to claim 5, wherein the server is configured to:
    store the tentative common key and time when the tentative common key is generated in combination;
    determine whether the tentative common key at the time of the authentication request the predetermined time lapsed since the time when the tentative common key is generated based on the stored time; and reject communication when the tentative common key at the time of the authentication request lapsed predetermined time since the time when the tentative common key is generated.

7. The data communication system according to claim 1, wherein when the tentative common key of the received authentication request has a pattern of the tentative common key which is not generated, the server invalidates the tentative common key.

8. The data communication system according to claim 7, wherein the server is configured to:
   determine whether the tentative common key of the authentication request received matches the stored tentative common key; and
   reject communication when the tentative common key of the authentication request received does not match the tentative common key already generated.

9. The data communication system according to claim 1, wherein the information processing device has a user interface receiving selection of the IoT device and a communication circuit capable of performing communication with the IoT device.

10. The data communication system according to claim 1, wherein the information processing device has a communication circuit capable of performing communication with the IoT device, and
   wherein the communication circuit requests the server for a common key for the IoT device when the communication circuit becomes able to communicate with the IoT device.

11. The data communication system according to claim 1, wherein the IoT device transmits a common key and encrypted data simultaneously to the server, and
   wherein the server checks whether authentication succeeds or not on the basis of the common key and, when the authentication succeeds, decrypts the encrypted data.

12. The data communication system according to claim 1, further comprising:
   an authorization server which communicates with the server,
   wherein, when the IoT device requests to be authenticated, the authorization server permits or rejects authentication of an IoT device.

13. A data communication system comprising:
   an IoT device;
   an information processing device that performs communication with the IoT device; and
   a server that communicates with the IoT device and the information processing device,
   wherein when a coupling request from the IoT device is received, the information processing device transmits a request to the server for a tentative common key which is temporarily valid,
   wherein when the request for the tentative common key from the information processing device is received, the server generates the tentative common key and transmits the generated tentative common key to the information processing device,
   wherein the information processing device transmits the generated tentative common key received from the server to the IoT device,
   wherein the IoT device and the server perform authentication by using the tentative common key,
   wherein in a case where a predetermined period lapsed since the tentative common key is generated, the server invalidates the tentative common key, and
   wherein the server is configured to:
      store the tentative common key and time when the tentative common key is generated in combination;
      determine whether the tentative common key at the time of the authentication request the predetermined time lapsed since the time when the tentative common key is generated based on the stored time; and
      reject communication when the tentative common key at the time of the authentication request lapsed predetermined time since the time when the tentative common key is generated.

\* \* \* \* \*